United States Patent [19]

Cooper et al.

[11] Patent Number: 4,676,971

[45] Date of Patent: Jun. 30, 1987

[54] METHOD FOR REMOVING CHLORATE FROM ALKALI METAL HYDROXIDE

[75] Inventors: William H. Cooper, Sulphur; Ana G. Brunet, Lake Charles, both of La.; William F. Campbell, Hurst, Tex.

[73] Assignee: PPG Industries, Inc., Pittsburgh, Pa.

[21] Appl. No.: 813,295

[22] Filed: Dec. 24, 1985

[51] Int. Cl.$^4$ .................. C01D 15/02; C25B 1/14; B01D 3/34

[52] U.S. Cl. .................. 423/641; 423/183; 203/32; 203/37; 203/61; 204/98

[58] Field of Search ............... 423/183, 478, 479, 641; 204/98, 99; 203/7, 32, 37, 61

[56] References Cited

U.S. PATENT DOCUMENTS

| | | | |
|---|---|---|---|
| 2,404,453 | 7/1946 | Osborne | 204/153 |
| 2,562,169 | 7/1951 | Brumbaugh | 423/179 |
| 2,610,105 | 9/1952 | Pye | 423/186 |
| 2,617,713 | 11/1952 | Ayers et al. | 423/183 |
| 2,790,707 | 4/1957 | Johnson | 423/199 |
| 2,823,177 | 2/1958 | Osborne | 204/295 |
| 2,889,204 | 6/1959 | Meyer et al. | 423/179 |
| 3,301,636 | 1/1967 | Otrhler | 423/641 |
| 3,325,251 | 6/1967 | Jewakker | 423/269 |
| 4,260,494 | 4/1981 | Dotson et al. | 204/99 |
| 4,282,178 | 8/1981 | Khare | 423/269 |

FOREIGN PATENT DOCUMENTS

| | | | |
|---|---|---|---|
| 53-70998 | 6/1978 | Japan | 423/641 |
| 1523979 | 9/1978 | United Kingdom | 423/641 |
| 922070 | 4/1982 | U.S.S.R. | 423/641 |

*Primary Examiner*—Gary P. Straub
*Attorney, Agent, or Firm*—Edward J. Whitfield; Bruce H. Cottrell

[57] ABSTRACT

A method is disclosed for reducing alkali metal chlorate impurities in an aqueous alkali metal hydroxide solution by heating a mixture of the alkali metal hydroxide solution with a hydroxycarboxylic acid or a salt thereof at temperature above about 125° C. and for a period of time sufficient to substantially eliminate the chlorate, the hydroxycarboxylic acid or salt thereof being substantially non-volatile at the heating temperature.

13 Claims, No Drawings

METHOD FOR REMOVING CHLORATE FROM ALKALI METAL HYDROXIDE

BACKGROUND OF THE INVENTION

The present invention relates to a method of reducing chlorates present in aqueous alkali metal hydroxide solutions. More particularly, this invention relates to a method of reducing chlorate impurities present in alkali metal hydroxide solutions by treatment with a hydroxycarboxylic acid.

Alkali metal hydroxide, e.g., sodium hydroxide or potassium hydroxide, is commonly produced by the electrolysis of aqueous alkali metal halide solutions in an electrolytic cell, e.g., a diaphragm-type cell. A product, commonly known as cell liquor, is obtained from diaphragm-type cells. Cell liquor generally contains from about 10 to 12 weight percent alkali metal hydroxide, 12 to 16 weight percent alkali metal halide, minor impurities, e.g., alkali metal chlorate, and the balance water. Generally, the total amount of alkali metal chlorate impurities ranges from about 20 to 400 parts per million (ppm) on an anhydrous basis.

In the production of anhydrous alkali metal hydroxide from cell liquor, alkali metal chlorate is normally present therein as an impurity and must be completely removed prior to dehydration of the cell liquor at high temperatures. Otherwise, thermal decomposition of the alkali metal chlorate can produce nascent oxygen and result in severe corrosion of nickel evaporators and other equipment used in the process.

In the processing of alkali metal hydroxide from electrolytic cells, the cell liquor is passed customarily to an evaporator system wherein a portion of the water and most of the alkali metal halide are removed. Substantially all of the alkali metal halide will be removed by the time the alkali metal hydroxide concentration reaches about 50 weight percent. The 50 weight percent alkali metal hydroxide solution is further concentrated by heating under vacuum to attain alkali metal hydroxide concentrations of about 73 weight percent. Subsequent evaporation of the remaining water from 73 weight percent alkali metal hydroxide can produce anhydrous alkali metal hydroxide. At the temperatures utilized in the final evaporation stage chlorate impurities can result in corrosion of metal parts, particularly nickel parts. The reduction of chlorate levels in aqueous alkali metal hydroxide solutions, particularly electrolytic cell alkali metal hydroxide solutions, is necessary to avoid corrosion problems.

It is known that sucrose (U.S. Pat. No. 2,610,103) and sorbitol (U.S. Pat. No. 3,380,806) may be added to alkali metal hydroxide solutions to reduce the chlorate impurities. In contrast, U.S. Pat. No. 3,380,806 discloses that lactic acid (a hydroxycarboxylic acid) is ineffective in reducing chlorates. However, lactic acid has a boiling point of 103° Celsius (C.) and may not be retained for a sufficient time to allow the reduction of the chlorate.

SUMMARY OF THE INVENTION

According to the present invention, the chlorate content in an aqueous alkali metal hydroxide solution can be reduced by heating a mixture of the chlorate-containing alkali metal hydroxide solution and an effective amount of a hydroxycarboxylic acid or a salt thereof at temperatures above about 125° C. for a sufficient period of time whereby the chlorate is substantially eliminated, the hydroxycarboxylic acid or salt thereof being substantially non-volatile in alkali metal hydroxide solutions at the heating temperatures.

DETAILED DESCRIPTION OF THE INVENTION

The present invention contemplates the reduction of chlorate impurities in an alkali metal hydroxide solution. The alkali metal hydroxide solution may be a sodium hydroxide solution or a potassium hydroxide solution, but will generally be a sodium hydroxide solution obtained from electrolysis of an aqueous sodium chloride solution in a diaphragm-type cell. Chlorate-containing alkali metal hydroxide solutions obtained from other sources, e.g., a membrane-type cell, can be treated in a like manner to reduce chlorate impurities. The chlorate impurities will generally be present as their alkali metal salts, i.e., as sodium chlorate in a sodium hydroxide solution and as potassium chlorate in a potassium hydroxide solution.

According to the present invention, the chlorate impurities within the alkali metal hydroxide solution, e.g., sodium hydroxide solution, can be reduced by heating a mixture of the chlorate-containing alkali metal hydroxide solution with an effective amount of a hydroxycarboxylic acid or a salt thereof to temperatures above about 125° C. for a sufficient period of time to substantially eliminate the chlorate.

The hydroxycarboxylic acid serves as a reducing agent and should be substantially non-volatile at the temperatures whereat the mixture is heated. By non-volatile is meant that at least a major portion of hydroxycarboxylic acid will remain nongaseous at the heating temperature. The hydroxycarboxylic acid or salt thereof should be substantially water soluble and soluble within concentrated alkali metal hydroxide solutions, e.g., within concentrated sodium hydroxide solutions, i.e., solutions above 50 percent by weight sodium hydroxide. Generally, the hydroxycarboxylic acid can be a mono-, di-, tri- or poly hydroxyl-containing compound and can be a mono-, di- or tri-carboxylic acid type compound. For example, the hydroxycarboxylic acid can be a monohydroxy monocarboxylic acid compound, such as hydroxyethanoic acid (glycolic acid), 2-hydroxybutanoic acid, 4-hydroxybutanoic acid, 2-hydroxyhexanoic acid, o-hydroxybenzoic acid (salicylic acid), m-hydroxybenzoic acid, p-hydroxybenzoic acid, hydroxy-(phenyl)-ethanoic acid (phenylglycolic acid), and hydroxy methylbenzoic acids, e.g., 2-hydroxy-3-methylbenzoic acid. The hydroxycarboxylic acid can be a monohydroxy dicarboxylic acid such as, 2-hydroxypropanedioic acid (tartronic acid), hydroxy-(methyl)propanedioic acid (alpha-isomalic acid), and 2-hydroxypentanedioic acid, a dihydroxy monocarboxylic acid, such as dihydroxybenzoic acids, e.g., 3,5-dihydroxybenzoic acid, a dihydroxy dicarboxylic acid, such as 2,3-dihydroxybutanedioic acid (tartaric acid), a monohydroxy tricarboxylic acid, such as 2-hydroxy-1,2,3-propane-tricarboxylic acid (citric acid), or tri- and polyhydroxy mono- and di-carboxylic acids, such as 2,3,4-trihydroxypentadioic acid, 2,3,4,5,6-pentahydroxyhexanoic acid, and 2,3,4,5-tetrahydroxyhexanedioic acid (mucic acid). Salts of the hydroxycarboxylic acids can be similarly employed, e.g., sodium, potassium or ammonium salts of the hydroxycarboxylic acids. For example, sodium citrate, sodium glycolate, sodium salicylate, and sodium tartrate can be heated in an admixture with the chlorate-containing alkali metal hydroxide solution.

The admixture of the chlorate-containing alkali metal hydroxide solution and a hydroxycarboxylic acid or salt thereof is heated to temperatures and for a period of time sufficient to substantially eliminate the chlorate impurity. Generally, the mixture is heated to temperatures above about 125° C., more preferably above about 135° C. and most preferably between about 145° C. and about 190° C. Temperatures below about 125° C. are found generally ineffective in reducing the chlorate levels. A sufficient period of time for heating the mixture can generally be from about 10 minutes up to about four hours or longer. The period of time sufficient to substantially eliminate the chlorate is generally inversely related to the heating temperature. That is, longer periods of time will be necessary with lower temperatures, while shorter time periods can be sufficient at higher temperatures.

The hydroxycarboxylic acid or salt thereof can be mixed with the chlorate-containing solution as a solid, a liquid or as a solution, e.g., an aqueous solution. Generally, a solution of the hydroxycarboxylic acid or salt thereof may be preferred to provide for improved mixing.

Some of the hydroxycarboxylic acid or salt thereof may be lost due to decomposition by the concentrated alkali metal hydroxide solution and the relatively high processing temperatures. As a result, an effective amount of the hydroxycarboxylic acid or salt thereof for mixing with the chlorate-containing alkali metal hydroxide solution to substantially reduce and eliminate the chlorate will generally range from a stoichiometric amount in relation to the amount of chlorate present in the solution up to a multiple of about 12 times the stoichiometric amount or more. The stoichiometric amount of hydroxycarboxylic acid or salt thereof can be determined readily by the skilled artisan for each acid or salt. The following equations for sodium citrate, glycolic acid and sodium tartrate are examples of balanced equations illustrating the stoichiometry of those reactions.

Sodium citrate
$$3NaClO_3 + Na_3C_6H_5O_7 + 9NaOH \rightarrow 3NaCl + 6Na_2CO_3 + 7H_2O$$

Glycolic acid:
$$C_2H_4O_3 + NaClO_3 + 4NaOH \rightarrow NaCl + 2Na_2CO_3 + 4H_2O$$

Sodium tartrate:
$$5NaClO_3 + 3Na_2C_4H_4O_6 + 18NaOH \rightarrow 5NaCl + 12Na_2CO_3 + 15H_2O.$$

In one embodiment of the present invention, an aqueous solution of a hydroxycarboxylic acid or salt thereof as a reducing agent, e.g., an aqueous solution of about 50 percent by weight sodium tartrate, is admixed with an aqueous solution of approximately 50 percent by weight sodium hydroxide. The hydroxycarboxylic acid or salt thereof is added as a multiple of from 1 to about 12 times the required stoichiometric amount. The sodium hydroxide solution contains from about 20 to about 400 ppm sodium chlorate on an anhydrous basis (AB). The 50 percent by weight sodium hydroxide is fed to a concentrator wherein the sodium hydroxide concentration is increased to about 70 percent at sub-atmospheric pressure and a temperature of about 120° C. Chlorate reduction is minimal in this concentration step. The concentrated admixture is heated than at atmospheric pressure to temperatures of between about 140° C. and 190° C. and retained in a storage vessel with stirring for between about 10 minutes and 100 minutes to substantially eliminate the chlorate impurities to a reduced level, preferably to less than ten ppm sodium chlorate on an anhydrous basis. The substantially chlorate-free sodium hydroxide solution is useful as feed to an evaporator containing nickel parts whereby the approximately 70 percent by weight sodium hydroxide solution is processed to anhydrous sodium hydroxide without corroding the nickel parts in the evaporator.

Alternatively, the hydroxycarboxylic acid reducing agent is admixed with the aqueous sodium hydroxide solution after it has been concentrated to about 70 percent by weight sodium hydroxide and then heated at temperatures between 140° C. and 190° C. for between about 10 and 100 minutes to reduce to chlorate impurity levels. Also, the hydroxycarboxylic acid reducing agent can be added to an aqueous sodium hydroxide solution of about 50 percent by weight sodium hydroxide and then the admixture can be concentrated at sub-atmospheric pressure and temperatures of between about 140° C. and 190° C. to substantially eliminate the chlorate impurities. In another alternative, the hydroxycarboxylic acid is added to an aqueous solution of about 70 percent by weight sodium hydroxide and this mixture is fed to an anhydrous concentrator. The remaining water is removed in the concentrator or evaporator at temperatures between 140° C. and 190° C. over periods of time from 10 to 100 minutes whereby the chlorate is substantially eliminated.

The present invention is further illustrated by the following examples.

EXAMPLE 1

An aqueous sample of 50 weight percent sodium hydroxide containing 0.076 weight percent sodium chlorate was charged to a beaker. An aqueous solution of 50 weight percent sodium tartrate in an amount calculated at about 12 times the stoichiometric amount necessary to reduce the chlorate was added to the beaker. The mixture was heated to and maintained at about 176° C. After 30 minutes, analysis for sodium chlorate indicated less than 0.001 weight percent remained.

The sodium chlorate content in the caustic solutions was determined in the following manner. A sample of caustic weighing 3.0 grams was introduced into a flask and diluted to 125 milliliters (ml) with distilled water. Then, 15.0 ml of 0.01 Normal (N) sodium arsenite was added to the flask. A strip of litmus paper was added, the sample was titrated with a 1 to 3 dilution of concentrated sulfuric acid to water until the sample is acidic, and then an additional 3 ml of the diluted sulfuric acid was added in excess. Ten drops of 0.01 Molar (M) osmium tetraoxide in a 0.1M sulfuric acid solution was added and slowly heated until the solution reached 45° C. An indicator, two drops of 0.025M o-phenanthroline ferrous sulfate, was added and the sample was titrated to a colorless or pale blue end point with standarized 0.1 N ceric nitrate in a 2N nitric acid solution. A reagent blank using only 125 ml of distilled water was run in a similar manner.

The sodium chlorate content is calculated as follows:

$$NaClO_3, \text{ppm } AB = \frac{(B - S) \times \text{Normality of ceric nitrate} \times 0.01775}{(\text{sample weight}) (\% \text{ NaOH}/100)} \times 10^6$$

where B=Blank ceric nitrate titer, ml
where S=Sample ceric nitrate titer, ml.

Table 1 presents further examples of treatments with hydroxycarboxylic acid compounds or salts thereof. These runs were conducted similarly to example 1 with the initial sodium chlorate content ranging from about 900 to 1500 ppm.

reduction of 32 percent and sucrose shows a chlorate reduction of 50 percent under identical conditions.

Obviously, many modifications and variations of the present invention are possible in light of the above disclosure. It is, therefore, to be understood that, within the scope of the appended claims, the invention may be practiced otherwise than as specifically described.

TABLE 1

| Additive | Multiple of Stoichiometric Amount | Temperature (°C.) | Heating period Minutes | $NaClO_3$ Initial | (ppm) ~ AB Final |
|---|---|---|---|---|---|
| Sodium Tartrate | 5X | 149 | 120 | 900 | 288 |
|  | 8X | 149 | 90 | 1040 | <10 |
|  | 10X | 149 | 60 | 1040 | <10 |
| Sodium Citrate | 8X | 176 | 120 | 1090 | 209 |
|  | 12X | 176 | 120 | 1000 | 88 |
| Glycolic Acid | 6X | 149 | 120 | 1054 | 349 |
|  | 12X | 149 | 120 | 1054 | <10 |
|  | 6X | 163 | 90 | 1064 | <10 |
|  | 12X | 163 | 60 | 1064 | <10 |
|  | 6X | 176 | 60 | 1160 | <10 |
|  | 12X | 176 | 30 | 1160 | <10 |

In Table 2, the percentage reduction of chlorate impurities is presented from runs with different multiples of stoichiometric amounts, retention times and temperatures. Runs with the prior art additives of sucrose and sorbitol are presented for comparison.

TABLE 2

| | Reduction of chlorate, % | | | | | | | | | | | |
|---|---|---|---|---|---|---|---|---|---|---|---|---|
| | Reaction Temperature, °C. | | | | | | | | | | | |
| | 135° C. | | | | 149° C. | | | | 163° C. | | | |
| Additive (Multiple of Stoichiometric Amount) | Retention Time, minutes | | | | | | | | | | | |
| | 30 | 60 | 90 | 120 | 30 | 60 | 90 | 120 | 30 | 60 | 90 | 120 |
| Sodium Tartrate | | | | | | | | | | | | |
| 5X | — | — | — | — | 29 | 52 | 52 | 67 | — | — | — | — |
| 6X | 15 | 21 | 35 | 44 | — | — | — | — | 91 | 100 | 100 | 96 |
| 8X | — | — | — | — | 59 | 87 | 100 | 100 | — | — | — | — |
| 10X | — | — | — | — | 71 | 100 | 100 | 100 | — | — | — | — |
| 12X | 22 | 50 | 66 | 83 | — | — | — | — | 100 | 100 | 100 | 100 |
| Sodium Citrate | | | | | | | | | | | | |
| 6X | — | — | — | — | 23 | 27 | 27 | 36 | — | — | — | — |
| 12X | — | — | — | — | 55 | 71 | 82 | 83 | — | — | — | — |
| Glycolic Acid | | | | | | | | | | | | |
| 6X | 8 | 9 | 15 | 19 | 19 | 30 | 51 | 66 | 46 | 80 | 100 | 100 |
| 12X | 15 | 23 | 33 | 50 | 37 | 68 | 95 | 100 | 75 | 100 | 100 | 100 |
| Sorbitol | | | | | | | | | | | | |
| 3X | 4 | 5 | 5 | 2 | 6 | 7 | 13 | 16 | 7 | 14 | 24 | 36 |
| 6X | 8 | 6 | 19 | 14 | 14 | 13 | 18 | 23 | 5 | 14 | 28 | 52 |
| 12X | 7 | 11 | 15 | 16 | 17 | 20 | 30 | 32 | 13 | 33 | 57 | 88 |
| Sucrose | | | | | | | | | | | | |
| 3X | 3 | 6 | 6 | 7 | 11 | 20 | 29 | 30 | 4 | 17 | 26 | 30 |
| 6X | 11 | 14 | 16 | 18 | 15 | 21 | 31 | 45 | 21 | 35 | 58 | 66 |
| 12X | 16 | 23 | 32 | 38 | 26 | 40 | 60 | 50 | 38 | 71 | 94 | 100 |

The results of tables 1 and 2 demonstrate the effectiveness of the present invention in reducing the chlorate content of aqueous sodium hydroxide solutions. For example, sodium tartrate shows a chlorate reduction of 44 percent at a multiple amount of six times the stoichiometric amount after heating at 135° C. for 120 minutes, whereas sorbitol shows a chlorate reduction of only 14 percent and sucrose shows a chlorate reduction of 18 percent under identical conditions. Similarly, sodium citrate shows chlorate reduction of 83 percent and glycolic acid (hydroxyethanoic acid) shows chlorate reduction of 100 percent at multiple amounts twelve times the stoichiometric amounts after heating at 149° C. for 120 minutes, whereas sorbitol shows chlorate

I claim:

1. A process for reducing chlorate concentration in a chlorate-containing aqueous alkali metal hydroxide solution, said process consisting of heating the alkali metal hydroxide solution in the presence of an effective amount of hydroxycarboxylic acid or sodium, potassium or ammonium salt thereof at a temperature of from at least 125° C. to about 190° C. for a time sufficient to substantially reduce the chlorate concentration in the alkali metal hydroxide solution, with the provisos that the hydroxycarboxylic acid or salt thereof is soluble in the alkali metal hydroxide solution and that the heating temperature is below the boiling point and decomposition temperature of the hydroxycarboxylic acid.

2. The process of claim 1 wherein the hydroxycarboxylic acid is selected from the group consisting of monohydroxymonocarboxylic acid, monohydroxydicarboxylic acid, monohydroxytricarboxylic acid, dihydroxymonocarboxylic acid and dihydroxydicarboxylic acid.

3. The process of claim 2 wherein the monohydroxymonocarboxylic acid is selected from the group consisting of hydroxyethanoic acid, 2-hydroxybutanoic acid, 4-hydroxybutanoic acid, o-hydroxybenzoic acid, m-hydroxybenzoic acid, p-hydroxybenzoic acid, hydroxy-(phenyl)ethanoic acid, and hydroxymethylbenzoic acid.

4. The process of claim 3 wherein the monohydroxymonocarboxylic acid is hydroxyethanoic acid.

5. The process of claim 2 wherein the monohydroxytricarboxylic acid salt is sodium citrate.

6. The process of claim 2 wherein the dihydroxydicarboxylic acid is 2,3-dihydroxybutanedioic acid.

7. The process of claim 2 wherein the dihydroxydicarboxylic acid salt is sodium tartrate.

8. The process of claim 1 wherein the effective amount of hydroxycarboxylic acid is at least six times the stoichiometric amount theoretically required to react with the chlorate.

9. The process of claim 1 wherein the temperature is at least about 140° C.

10. A process for reducing sodium chlorate concentration in a sodium chlorate-containing aqueous sodium hydroxide solution containing about 50 percent by weight sodium hydroxide, said process consisting of heating the sodium hydroxide solution in the presence of hydrocarboxylic acid or sodium, potassium or ammonium salt thereof at a temperature of from at least 125° C. to about 190° C. for a time sufficient to substantially reduce the sodium chlorate concentration in the sodium hydroxide solution, with the provisos that the hydroxycarboxylic acid or salt thereof is soluble in the sodium hydroxide solution and that the heating temperature is below the melting point and decomposition temperature of the hydroxycarboxylic acid.

11. The process of claim 10 wherein the hydroxycarboxylic acid or salt thereof is selected from the group consisting of hydroxyethanoic acid, sodium citrate and sodium tartrate.

12. The process of claim 10 wherein the heating temperature is at least about 140° C.

13. The process of claim 10 wherein the effective amount of hydroxycarboxylic acid is at least six times the stoichiometric amount theoretically required to react with the sodium chlorate.

* * * * *